US010867184B2

United States Patent
Choutas et al.

(10) Patent No.: US 10,867,184 B2
(45) Date of Patent: Dec. 15, 2020

(54) SYSTEM AND METHOD FOR TRAINING A CONVOLUTIONAL NEURAL NETWORK AND CLASSIFYING AN ACTION PERFORMED BY A SUBJECT IN A VIDEO USING THE TRAINED CONVOLUTIONAL NEURAL NETWORK

(71) Applicant: Naver Corporation, Seongnam-si (KR)

(72) Inventors: Vasileios Choutas, Larissa (GR); Philippe Weinzaepfel, Montbonnot-Saint-Martin (FR); Jérôme Revaud, Meylan (FR); Cordelia Schmid, Saint Ismier (FR)

(73) Assignee: Naver Corporation

( * ) Notice: Subject to any disclaimer, the term of this patent is extended or adjusted under 35 U.S.C. 154(b) by 44 days.

(21) Appl. No.: 16/359,182

(22) Filed: Mar. 20, 2019

(65) Prior Publication Data

US 2019/0303677 A1   Oct. 3, 2019

Related U.S. Application Data

(60) Provisional application No. 62/818,780, filed on Mar. 15, 2019.

(30) Foreign Application Priority Data

Mar. 30, 2018   (EP) .................................... 18305367

(51) Int. Cl.
*G06K 9/00*    (2006.01)
*G06T 7/73*    (2017.01)
(Continued)

(52) U.S. Cl.
CPC ..... *G06K 9/00718* (2013.01); *G06K 9/00335* (2013.01); *G06K 9/00744* (2013.01);
(Continued)

(58) Field of Classification Search
CPC ........ G06N 3/0454; G06N 3/08; G06N 20/00; G06N 20/20; G06N 3/088
See application file for complete search history.

(56) References Cited

U.S. PATENT DOCUMENTS

| | | | | |
|---|---|---|---|---|
| 7,564,620 B2 * | 7/2009 | Winterot | ............ | G02B 27/0075 359/379 |
| 7,949,191 B1 * | 5/2011 | Ramkumar | ............ | G06K 9/723 382/209 |

(Continued)

FOREIGN PATENT DOCUMENTS

CN    107273800    10/2017

OTHER PUBLICATIONS

Bilen, H., B. Fernando, E. Gavves, A. Vedaldi, and S. Gould. 'Dynamic Image Networks for Action Recognition'. In 2016 IEEE Conference on Computer Vision and Pattern Recognition (CVPR), 3034-42, 2016. https://doi.org/10.1109/CVPR.2016.331. 2016.

(Continued)

*Primary Examiner* — Yosef Kassa
(74) *Attorney, Agent, or Firm* — Basch & Nickerson LLP; Michael J. Nickerson

(57) ABSTRACT

A method for training a convolutional neural network for classification of actions performed by subjects in a video is realized by (a) for each frame of the video, for each key point of the subject, generating a heat map of the key point representing a position estimation of the key point within the frame; (b) colorizing each heat map as a function of the relative time of the corresponding frame in the video; (c) for each key point, aggregating all the colorized heat maps of the key point into at least one image representing the evolution of the position estimation of the key point during the video; and training the convolutional neural network using as input the sets associated to each training video of (Continued)

images representing the evolution of the position estimation of each key point during the video.

32 Claims, 7 Drawing Sheets

(51) Int. Cl.
 *G06K 9/62* (2006.01)
 *G06T 7/246* (2017.01)
(52) U.S. Cl.
 CPC ......... *G06K 9/6232* (2013.01); *G06K 9/6256* (2013.01); *G06T 7/73* (2017.01); *G06T 7/246* (2017.01); *G06T 2207/10016* (2013.01); *G06T 2207/20081* (2013.01); *G06T 2207/20084* (2013.01); *G06T 2207/30196* (2013.01)

(56) References Cited

U.S. PATENT DOCUMENTS

| | | | | |
|---|---|---|---|---|
| 8,165,407 B1* | 4/2012 | Khosla | ............... | G06K 9/4623 382/224 |
| 8,442,321 B1* | 5/2013 | Chang | ............... | G06K 9/6289 382/181 |
| 8,615,105 B1* | 12/2013 | Cheng | ............... | G06K 9/00771 382/103 |
| 8,760,756 B2 | 6/2014 | Price | ............... | G02B 21/244 359/368 |
| 8,761,512 B1* | 6/2014 | Buddemeier | ........ | G06K 9/6282 382/181 |
| 8,768,065 B2* | 7/2014 | Melikian | ............... | G06K 9/6202 382/195 |
| 8,805,029 B1* | 8/2014 | Yeung | ............... | G06K 9/00241 382/115 |
| 9,092,736 B2* | 7/2015 | Aparin | ............... | G06N 3/06 |
| 9,251,493 B2* | 2/2016 | Jacobs | ............... | A61J 7/04 |
| 9,652,890 B2* | 5/2017 | Beeler | ............... | H04N 5/225 |
| 9,836,839 B2* | 12/2017 | Champlin | ......... | G06K 9/00147 |
| 2017/0255832 A1 | 9/2017 | Jones et al. | | |

OTHER PUBLICATIONS

Brox, Thomas, Andrés Bruhn, Nils Papenberg, and Joachim Weickert. 'High Accuracy Optical Flow Estimation Based on a Theory for Warping'. In Computer Vision—ECCV 2004, edited by Tomás Pajdla and Jiří Matas, 3024:25-36. Berlin, Heidelberg: Springer Berlin Heidelberg, 2004. https://doi.org/10.1007/978-3-540-24673-2_3. 2004.
Cao, Congqi, Yifan Zhang, Chunjie Zhang, and Hanqing Lu. 'Action Recognition with Joints-Pooled 3D Deep Convolutional Descriptors', n.d., 7. 2016.
Cao, Z., T. Simon, S. Wei, and Y. Sheikh. 'Realtime Multi-Person 2D Pose Estimation Using Part Affinity Fields'. In 2017 IEEE Conference on Computer Vision and Pattern Recognition (CVPR), 1302-10, 2017. https://doi.org/10.1109/CVPR.2017.143. 2017.
Carreira, J., and A. Zisserman. 'Quo Vadis, Action Recognition? A New Model and the Kinetics Dataset'. In 2017 IEEE Conference on Computer Vision and Pattern Recognition (CVPR), 4724-33, 2017. https://doi.org/10.1109/CVPR.2017.502. 2017.
Chéron, Guilhem, Ivan Laptev, and Cordelia Schmid. 'P-CNN: Pose-Based CNN Features for Action Recognition'. ArXiv:1506.03607 [Cs], Jun. 11, 2015. http://arxiv.org/abs/1506.03607. 2015.
Donahue, Jeff, Lisa Anne Hendricks, Marcus Rohrbach, Subhashini Venugopalan, Sergio Guadarrama, Kate Saenko, and Trevor Darrell. 'Long-Term Recurrent Convolutional Networks for Visual Recognition and Description'. ArXiv:1411.4389 [Cs], Nov. 17, 2014. http://arxiv.org/abs/1411.4389. 2014.
Du, W., Y. Wang, and Y. Qiao. 'RPAN: An End-to-End Recurrent Pose-Attention Network for Action Recognition in Videos'. In 2017 IEEE International Conference on Computer Vision (ICCV), 3745-54, 2017. https://doi.org/10.1109/ICCV.2017.402. 2017.
Feichtenhofer, Christoph, Axel Pinz, and Richard Wildes. 'Spatiotemporal Residual Networks for Video Action Recognition'. In Advances in Neural Information Processing Systems 29, edited by D. D. Lee, M. Sugiyama, U. V. Luxburg, I. Guyon, and R. Garnett, 3468-3476. Curran Associates, Inc., 2016. http://papers.nips.cc/paper/6433-spatiotemporal-residual-networks-for-video-action-recognition.pdf. 2016.
Feichtenhofer, Christoph, Axel Pinz, and Andrew Zisserman. 'Convolutional Two-Stream Network Fusion for Video Action Recognition'. In 2016 IEEE Conference on Computer Vision and Pattern Recognition (CVPR), 1933-41. Las Vegas, NV, USA: IEEE, 2016. https://doi.org/10.1109/CVPR.2016.213. 2016.
Girdhar, Rohit, and Deva Ramanan. 'Attentional Pooling for Action Recognition'. In Advances in Neural Information Processing Systems 30, edited by I. Guyon, U. V. Luxburg, S. Bengio, H. Wallach, R. Fergus, S. Vishwanathan, and R. Garnett, 34-45. Curran Associates, Inc., 2017. 2017.
Gkioxari, Georgia, and Jitendra Malik. 'Finding Action Tubes'. In 2015 IEEE Conference on Computer Vision and Pattern Recognition (CVPR), 759-68. Boston, MA, USA: IEEE, 2015. https://doi.org/10.1109/CVPR.2015.7298676. 2015.
Glorot, Xavier, and Yoshua Bengio. 'Understanding the Difficulty of Training Deep Feedforward Neural Networks', 8, 2010. 2010.
Hausknecht, and M., S. Vijayanarasimhan, O. Vinyals, R. Monga, and G. Toderici. 'Beyond Short Snippets: Deep Networks for Video Classification'. In 2015 IEEE Conference on Computer Vision and Pattern Recognition (CVPR), 4694-4702, 2015. https://doi.org/10.1109/CVPR.2015.7299101. 2015.
He, Kaiming, Xiangyu Zhang, Shaoqing Ren, and Jian Sun. 'Deep Residual Learning for Image Recognition'. In 2016 IEEE Conference on Computer Vision and Pattern Recognition (CVPR), 770-78. Las Vegas, NV, USA: IEEE, 2016. https://doi.org/10.1109/CVPR.2016.90. 2016.
Ioffe, Sergey, and Christian Szegedy. 'Batch Normalization: Accelerating Deep Network Training by Reducing Internal Covariate Shift'. ArXiv:1502.03167 [Cs], Feb. 10, 2015. http://arxiv.org/abs/1502.03167. 2015.
Jain, Suyog Dutt, Bo Xiong, and Kristen Grauman. 'FusionSeg: Learning to Combine Motion and Appearance for Fully Automatic Segmentation of Generic Objects in Videos'. In 2017 IEEE Conference on Computer Vision and Pattern Recognition (CVPR), 2117-26. Honolulu, HI: IEEE, 2017. https://doi.org/10.1109/CVPR.2017.228. 2017.
Jhuang, Hueihan, Juergen Gall, Silvia Zuffi, Cordelia Schmid, and Michael J. Black. 'Towards Understanding Action Recognition'. In 2013 IEEE International Conference on Computer Vision, 3192-99. Sydney, Australia: IEEE, 2013. https://doi.org/10.1109/ICCV.2013.396. 2013.
Kalogeiton, Vicky, Philippe Weinzaepfel, Vittorio Ferrari, and Cordelia Schmid. 'Action Tubelet Detector for Spatio-Temporal Action Localization'. In 2017 IEEE International Conference on Computer Vision (ICCV), 4415-23. Venice: IEEE, 2017. https://doi.org/10.1109/ICCV.2017.472. 2017.
Kay, Will, Joao Carreira, Karen Simonyan, Brian Zhang, Chloe Hillier, Sudheendra Vijayanarasimhan, Fabio Viola, et al. 'The Kinetics Human Action Video Dataset'. ArXiv:1705.06950 [Cs], May 19, 2017. http://arxiv.org/abs/1705.06950. 2017.
Kingma, Diederik P., and Jimmy Ba. 'Adam: A Method for Stochastic Optimization'. ArXiv:1412.6980 [Cs], Dec. 22, 2014. http://arxiv.org/abs/1412.6980. 2014.
Klaeser, A., M. Marszalek, and C. Schmid. 'A Spatio-Temporal Descriptor Based on 3D-Gradients'. In Procedings of the British Machine Vision Conference 2008, 99.1-99.10. Leeds: British Machine Vision Association, 2008. https://doi.org/10.5244/C.22.99. 2008.
Krizhevsky, Alex, Ilya Sutskever, and Geoffrey E Hinton. 'ImageNet Classification with Deep Convolutional Neural Networks'. In Advances in Neural Information Processing Systems 25, edited by F. Pereira, C. J. C. Burges, L. Bottou, and K. Q. Weinberger, 1097-1105. Curran Associates, Inc., 2012. http://papers.nips.cc/paper/4824-imagenet-classification-with-deep-convolutional-neural-networks.pdf. 2012.

(56) References Cited

OTHER PUBLICATIONS

Kuehne, H, H Jhuang, E Garrote, T Poggio, and T Serre. 'HMDB: A Large Video Database for Human Motion Recognition', 8, 2011. 2011.

Laptev, Ivan. 'On Space-Time Interest Points'. International Journal of Computer Vision 64, No. 2-3 (Sep. 2005): 107-23. https://doi.org/10.1007/s11263-005-1838-7. 2005.

Lin, Tsung-Yi, Michael Maire, Serge Belongie, Lubomir Bourdev, Ross Girshick, James Hays, Pietro Perona, Deva Ramanan, C. Lawrence Zitnick, and Piotr Dollár. 'Microsoft COCO: Common Objects in Context'. ArXiv:1405.0312 [Cs], May 1, 2014. http://arxiv.org/abs/1405.0312. 2014.

Liu, Jun, Amir Shahroudy, Dong Xu, and Gang Wang. 'Spatio-Temporal LSTM with Trust Gates for 3D Human Action Recognition'. ArXiv:1607.07043 [Cs], Jul. 24, 2016. http://arxiv.org/abs/1607.07043. 2016.

Newell, Alejandro, Kaiyu Yang, and Jia Deng. 'Stacked Hourglass Networks for Human Pose Estimation'. ArXiv:1603.06937 [Cs], Mar. 22, 2016. http://arxiv.org/abs/1603.06937. 2016.

Nie, B. X., C. Xiong, and S. Zhu. 'Joint Action Recognition and Pose Estimation from Video'. In 2015 IEEE Conference on Computer Vision and Pattern Recognition (CVPR), 1293-1301, 2015. https://doi.org/10.1109/CVPR.2015.7298734. 2015.

Peng, Xiaojiang, and Cordelia Schmid. 'Multi-Region Two-Stream R-CNN for Action Detection'. In Computer Vision—ECCV 2016, edited by Bastian Leibe, Jiri Matas, Nicu Sebe, and Max Welling, 9908:744-59. Cham: Springer International Publishing, 2016. https://doi.org/10.1007/978-3-319-46493-0_45. 2016.

Saha, Suman, Gurkirt Singh, Michael Sapienza, Philip Torr, and Fabio Cuzzolin. 'Deep Learning for Detecting Multiple Space-Time Action Tubes in Videos'. In Procedings of the British Machine Vision Conference 2016, 58.1-58.13. York, UK: British Machine Vision Association, 2016. https://doi.org/10.5244/C.30.58. 2016.

Shahroudy, A., J. Liu, T. Ng, and G. Wang. 'NTU RGB+D: A Large Scale Dataset for 3D Human Activity Analysis'. In 2016 IEEE Conference on Computer Vision and Pattern Recognition (CVPR), 1010-19, 2016. https://doi.org/10.1109/CVPR.2016.115. 2016.

Simonyan, Karen, and Andrew Zisserman. 'Two-Stream Convolutional Networks for Action Recognition in Videos'. In Advances in Neural Information Processing Systems 27, edited by Z. Ghahramani, M. Welling, C. Cortes, N. D. Lawrence, and K. Q. Weinberger, 568-576. Curran Associates, Inc., 2014. http://papers.nips.cc/paper/5353-two-stream-convolutional-networks-for-action-recognition-in-videos.pdf. 2014.

Simonyan, Karen, and Andrew Zisserman. 'Very Deep Convolutional Networks for Large-Scale Image Recognition'. ArXiv:1409.1556 [Cs], Sep. 4, 2014. http://arxiv.org/abs/1409.1556. 2014.

Soomro, Khurram, Amir Roshan Zamir, and Mubarak Shah. 'UCF101: A Dataset of 101 Human Actions Classes From Videos in The Wild'. ArXiv:1212.0402 [Cs], Dec. 3, 2012. http://arxiv.org/abs/1212.0402. 2012.

Srivastava, Nitish, Geoffrey Hinton, Alex Krizhevsky, Ilya Sutskever, and Ruslan Salakhutdinov. 'Dropout: A Simple Way to Prevent Neural Networks from Overfitting', n.d., 30. 2014.

Sun, Lin, Kui Jia, Kevin Chen, Dit Yan Yeung, Bertram E. Shi, and Silvio Savarese. 'Lattice Long Short-Term Memory for Human Action Recognition'. In 2017 IEEE International Conference on Computer Vision (ICCV), 2166-75. Venice: IEEE, 2017. https://doi.org/10.1109/ICCV.2017.236. 2017.

Szegedy, C., and, P. Sermanet, S. Reed, D. Anguelov, D. Erhan, V. Vanhoucke, and A. Rabinovich. 'Going Deeper with Convolutions'. In 2015 IEEE Conference on Computer Vision and Pattern Recognition (CVPR), 1-9, 2015. https://doi.org/10.1109/CVPR.2015.7298594. 2015.

Tokmakov, Pavel, Karteek Alahari, and Cordelia Schmid. 'Learning Motion Patterns in Videos'. In CVPR—IEEE Conference on Computer Vision & Pattern Recognition, 531-39. Honolulu, United States: IEEE, 2017. https://doi.org/10.1109/CVPR.2017.64. 2017.

Tran, D., L. Bourdev, R. Fergus, L. Torresani, and M. Paluri. 'Learning Spatiotemporal Features with 3D Convolutional Networks'. In 2015 IEEE International Conference on Computer Vision (ICCV), 4489-97, 2015. https://doi.org/10.1109/ICCV.2015.510. 2015.

Tran, Du, Jamie Ray, Zheng Shou, Shih-Fu Chang, and Manohar Paluri. 'ConvNet Architecture Search for Spatiotemporal Feature Learning'. ArXiv:1708.05038 [Cs], Aug. 16, 2017. http://arxiv.org/abs/1708.05038. 2017.

Wang, C., Y. Wang, and A. L. Yuille. 'An Approach to Pose-Based Action Recognition'. In 2013 IEEE Conference on Computer Vision and Pattern Recognition, 915-22, 2013. https://doi.org/10.1109/CVPR.2013.123. 2013.

Wang, H., and C. Schmid. 'Action Recognition with Improved Trajectories'. In 2013 IEEE International Conference on Computer Vision, 3551-58, 2013. https://doi.org/10.1109/ICCV.2013.441. 2013.

Wang, Limin, Yuanjun Xiong, Zhe Wang, Yu Qiao, Dahua Lin, Xiaoou Tang, and Luc Van Gool. 'Temporal Segment Networks: Towards Good Practices for Deep Action Recognition'. ArXiv:1608.00859 [Cs], Aug. 2, 2016. http://arxiv.org/abs/1608.00859. 2016.

Yong Du, Wei Wang, and Liang Wang. 'Hierarchical Recurrent Neural Network for Skeleton Based Action Recognition'. In 2015 IEEE Conference on Computer Vision and Pattern Recognition (CVPR), 1110-18. Boston, MA, USA: IEEE, 2015. https://doi.org/10.1109/CVPR.2015.7298714. 2015.

Zach, C., T. Pock, and H. Bischof. 'A Duality Based Approach for Realtime TV-L 1 Optical Flow'. In Pattern Recognition, edited by Fred A. Hamprecht, Christoph Schnörr, and Bernd Jähne, 4713:214-23. Berlin, Heidelberg: Springer Berlin Heidelberg, 2007. https://doi.org/10.1007/978-3-540-74936-3_22. 2007.

Zolfaghari, M., G. L. Oliveira, N. Sedaghat, and T. Brox. 'Chained Multi-Stream Networks Exploiting Pose, Motion, and Appearance for Action Classification and Detection'. In 2017 IEEE International Conference on Computer Vision (ICCV), 2923-32, 2017. https://doi.org/10.1109/ICCV.2017.316. 2017.

Ali Diba et al., "Deep Temporal Linear Encoding Networks," Arvix.org, Cornell University Library, 201 Olin Library, Cornell Unversity, Ithace, NY 14853: Nov. 21, 2016 Nov. 21, 2016.

English Abstract of Published Chinese Patent Application 107273800 (Oct. 20, 2017) Oct. 20, 2017.

European Search Report for European Patent Application 18305367.7 (dated Sep. 26, 2018) dated Sep. 26, 2018.

* cited by examiner

SYSTEM AND METHOD FOR TRAINING A CONVOLUTIONAL NEURAL NETWORK AND CLASSIFYING AN ACTION PERFORMED BY A SUBJECT IN A VIDEO USING THE TRAINED CONVOLUTIONAL NEURAL NETWORK

PRIORITY INFORMATION

Pursuant to 35 U.S.C. § 119 (a), this application claims the benefit of earlier filing date and right of priority to European Patent Application Number EP 18305367.7, filed on Mar. 30, 2018, the contents of which are hereby incorporated by reference in their entirety.

The present application claims priority, under 35 USC § 119(e), from U.S. Provisional patent application, Ser. No. 62/818,780, filed on Mar. 15, 2019. The entire content of U.S. Provisional patent application, Ser. No. 62/818,780, filed on Mar. 15, 2019, is hereby incorporated by reference.

BACKGROUND

Computer vision is a recent field of endeavor which aims at providing computers with high-level understanding from digital videos. Computer vision seeks to automate tasks that the human visual system can do.

One of the most challenging tasks is the human action recognition; i.e., the ability to visually identify an action performed by a human, in particular among a list of possibilities (classification).

For example, it could be useful for automatically detecting threats in public space (for example a fight, the draw of a weapon, etc.), a need for assistance (for example a fall in stairs, a sudden stroke, a panic, etc.), or simply for improving interactions with robots, such as an autonomous vehicle, which could detect dangerous behaviors of humans adapt its speed accordingly.

In the context of indexing a huge amount of videos or proposing ads, computer vision could allow to base the relevance not only on the metadata, which might be biased, but also on the actual content of the videos.

The difficulty of human action recognition is due to the huge number and the variability in possible actions, and to the importance of multiple cues (appearance, motion, pose, objects, etc.) for different actions. In addition, actions can span various temporal extents and can be performed at different speeds.

Conventionally, convolutional neural networks have been used in connection with human action recognition. Convolutional neural networks are a type of a neural network wherein the connection pattern between the neurons is inspired by the visual cortex of animals. Convolutional neural networks are suitable for video processing because Convolutional neural networks efficiently enable the recognition of objects or people in images.

After a supervised learning stage, wherein a convolutional neural network is trained by feeding the convolutional neural network a training set of videos already classified; i.e., provided with the labels of the actions that occurs in the videos, the convolutional neural network are able to classify some human actions within inputted videos (which are not labelled, in particular "fresh" videos from live closed-circuit television).

One conventional method, as disclosed by J. Carreira and A. Zisserman in "Quo Vadis, Action Recognition? A New Model and the Kinetics Dataset", for human action recognition utilizes a "two streams" approach, wherein the two classification streams are trained independently and combined at test time. The first classification stream operates on the appearance of the video by taking RGB data as input. The second classification stream is based on the motion, taking as input the optical flow that is computed with conventional methods, converted into images and stacked over several frames.

More specifically, the above-identified conventional method uses a two-stream inflated three-dimensional convolutional neural network that is based on two-dimensional convolutional neural network inflation: filters and pooling kernels of very deep image classification convolutional neural networks are expanded into three-dimensions.

This conventional method does not address all instances of human action recognition because the conventional method does not recognize some human actions. Moreover, the conventional method requires several days of training and a careful initialization.

Therefore, it is desirable to provide human action recognition method that recognizes substantially all human actions.

Moreover, it is desirable to provide human action recognition method that recognizes substantially all human actions which can be trained quickly.

In addition, it is desirable to provide human action recognition method that recognizes substantially all human actions which can be trained quickly and without a lot initialization work.

Furthermore, it is desirable to provide human action recognition method that uses convolutional neural networks which can be trained quickly and without a lot initialization work.

BRIEF DESCRIPTION OF THE DRAWINGS

The drawings are only for purposes of illustrating various embodiments and are not to be construed as limiting, wherein.

DETAILED DESCRIPTION OF THE DRAWING

Figure 1:
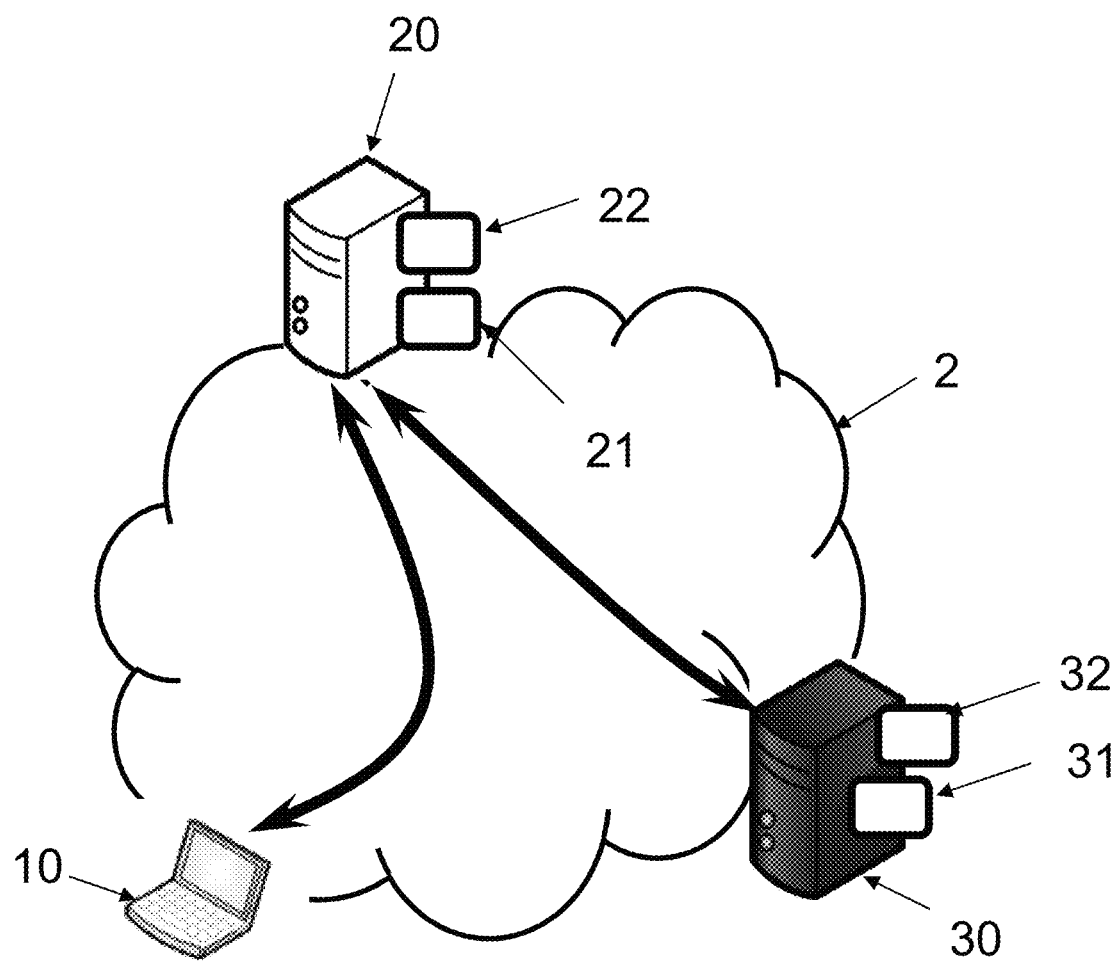
FIG. 1 illustrates an example of an architecture to enable a human action recognition method.

As set forth below, two complementary aspects of a human action recognition method are described. One aspect is directed to a method for training a convolutional neural network for action classification of videos, and a second aspect is directed to a method for action classification of an inputted video using a convolutional neural network, trained according to the first aspect (training method).

In the description below, action classification of videos is defined as classification of actions performed by subjects in videos; i.e., the identification of at least one (possibly several) action occurring in the video, among a predetermined list of actions (which will be called "reference actions"). It is to be understood that there might be in some cases no action to be identified within the video.

In the description below, videos (already classified or to be classified) are "trimmed," wherein trim is defined as videos being cut so as to last only a short amount of time (a few seconds) around a particular action. In such a case, each video contains one, and only one, action. The classification aims at identifying this one action.

It is noted that in the below described action classification, the action classification can be also extended to untrimmed videos and related task such as action detection in time, by using a sliding window approach with multiple scales, in order to handle various time intervals than an action can span.

Any video (trimmed or not) is a sequence of T frames (according to its length), numbered from 1 to T. In other words, a generic frame of a video will be referred to as frame, t, with $t \in [\![1;T]\!]$. Each frame is an image: i.e., a matrix of pixels of a given size, for instance 368×368 pixels.

It is noted that in the below described action classification, the actions in videos are actions performed by a determined "subject," wherein "subject" is defined as any kind of target detectable in a video, which can perform actions, and which presents recognizable "key points."

For example, the action may be a living being action (i.e., the subject is a living being), and more particularly, a human action (i.e., the subject is a human). In the example of human action classification, as it will be explained in more detail below, the key points are distinctive human anatomical features, in particular joints (such as knee, elbow, shoulder, etc.), extremities (such as hands, feet, head, etc.), or visible organs (such as eyes, ears, nose, etc.).

In other words, the key points are points of the subjects, which are easily trackable and allow distinguishing actions. For instance, in the case of human joints, the wrist is easily extracted and allows distinguishing a wide range of arm poses.

A predetermined list of n key points may be provided. A generic key point of the list will be referred to as key point, j, with $j \in [\![1;n]\!]$. For instance, n=18 human joints (in particular two ankles, two knees, two hips, two shoulders, two elbows, two wrists, two ears, two eyes, nose, and body center) may be considered as key points.

Although the below described example of a human action classification, the classification process uses joints as key points, it is noted that the classification process is equally applicable to other scenarios; such as the classification of animal actions (the key points could still be distinctive anatomical features such as joints) or the classification of vehicle actions (the key points could be mechanical parts such as a wheel, a wing tip, a headlamp, a jet engine, etc.).

In the below described example of a human action classification, at least part of the following list of reference actions could be used: ride bike, chew, wave, talk, swing baseball, drink, pullup, throw, clap, turn, smoke, handstand, ride horse, flic flac, golf, push, dribble, shoot bow, somersault, jump, sit-up, dive, climb stairs, eat, run, laugh, shoot gun, punch, pushup, shoot ball, sit, kiss, catch, climb, shake hands, brush hair, kick ball, hit, walk, fall floor, smile, hug, cartwheel, stand, pour, kick, sword exercise, pick, fencing, draw sword.

FIG. 1 illustrates the system for implementing the above mentioned two types (aspects) of the action classification method. As illustrated, FIG. 1 shows a first server 20 and a second server 30. The first server 20 is the learning server (implementing the first method) and the second server 30 is a classification server (implementing the second method). It is noted that these two servers may be merged.

Each server (20 and 30) may be remote computer equipment connected to an extended network 2 such as the Internet for data exchange. Each server (20 and 30) includes a data processor (21 and 31) and memory (22 and 32) such as hard disk.

The memory 22 of the first server 21 stores a training database; i.e., a set of already classified data (as opposed to inputted data that is the subject of classification). The data constitutes videos (in particular trimmed videos), the training examples being videos with labels of actions occurring within the video. In other words, the training video depicts the subject (in particular the human) performing already classified actions.

FIG. 1 illustrates client equipment 10, which may be a work station (also connected to network 2). It is noted that client equipment 10 may be merged with one or both servers (20 and 30).

In the example of FIG. 1, the client equipment 10 has one or more items to be classified. The operators of equipment 10 are typically "clients," in the commercial meaning of the term, or the service provider operating the first and/or second servers (20 and 30).

With respect to FIG. 1, a training method can be implemented by the data processor 21 of the first server 20. The method trains a convolution neural network for classification of actions performed by subjects in a video 100.

Figure 2:
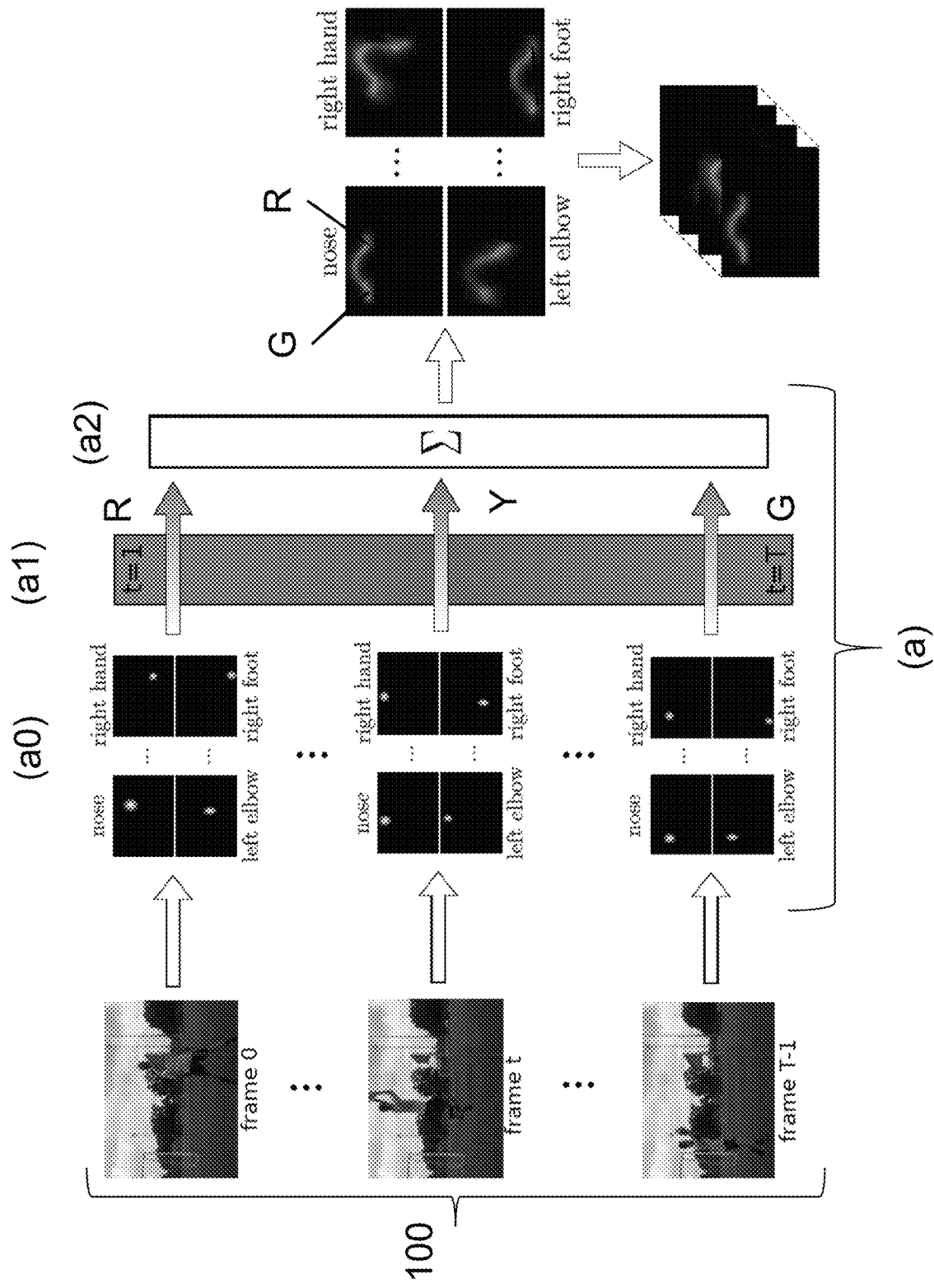
FIG. 2 illustrates a block diagram of processing video performed by a human action recognition method.

In a first step (a), illustrated by FIG. 2, the training video 100 is preprocessed so as to obtain a "compact" representation of the entire video, which jointly considers appearance and motion.

In other words, instead of training independently two classification streams, as done in the conventional classification methods, respectively for appearance and motion, the classification method of FIG. 2 deals with appearance and motion simultaneously. This compact process, in the description below, can be referred as "PoTion," wherein PoTion means the encoding of both pose and motion or pose/motion encoding.

PoTion focuses on the movement of a few relevant key points over an entire video. Modeling the motion of a few key points stands in contrast to the conventional processing of the optical flow in which all pixels are given the same importance independently of their semantics.

Using a video-level representation allows the capture of long-term dependencies, in contrast to most conventional approaches that are limited to frames or snippets.

Moreover, as it will be explained in more detail below, PoTion is fixed-size; i.e., it does not depend on the duration of the video clip. PoTion can thus be passed to a conventional convolutional neural network for classification without having to resort to recurrent networks or more sophisticated schemes.

It is to be understood that the convolutional neural network is not involved in step (a), or the convolutional neural network is trained end-to-end from heat map extraction to PoTion classification, as the process is fully differentiable.

As illustrated in FIG. 2, step (a) includes the iterative processing of each video of the training set. As illustrated in FIG. 2, each video is processed frame by frame (frame 0 . . . frame t . . . frame T−1), and for each frame, key point by key point. In the example of FIG. 2, four key points are considered: nose, left elbow, right hand, and right foot.

In a first sub step (a0), as illustrated in FIG. 2, for each frame t∈〚1;T〛 of the video, for each key point j∈〚1;n〛 of the list of key points, data processor 21 of the first server 20 generates a heat map $\mathcal{H}_j^t$ of the key point representing a position estimation of the key point within the frame.

The heat map $\mathcal{H}_j^t$ is associated with the pair (frame t, key point j). In other words, a collection $\{\mathcal{H}_j^t\}_{t\in〚1;T〛, j\in〚1;n〛}$ of T·n heat maps $\mathcal{H}_j^t$ is generated. It is noted that for each frame t, a further heat map $\mathcal{H}_0^t$ could be generated for the background.

The sub step (a0) could be seen as a key point localization task. In this description, a heat map is a probabilistic map indicating the estimated probability at each pixel for the presence of each joint; i.e., $\mathcal{H}_j^t$ [x;y] is the likelihood of pixel (x;y) containing key point j at frame t.

Two-dimensional pose estimation methods that output key point heat maps are well known to those skilled in the art. For example, Z. Cao et al. discloses, in "Realtime multi-person 2D pose estimation using part affinity fields," a two-dimensional pose estimation method for generating human joints heat maps.

The two-dimensional pose estimation method can handle the presence of multiple people and is robust to occlusion and truncation.

For example, a conventional two-dimensional pose estimation method that outputs key point heat maps takes, as input, a color image of size w×h and produces, as output, the two-dimensional locations of anatomical key-points for each subject in the image.

A feed-forward network simultaneously predicts a set of two-dimensional confidence maps S of body part locations and a set of two-dimensional vector fields L of part affinities, which encode the degree of association between parts.

The set $S=(S_1, S_2, \ldots, S_J)$ has J confidence maps, one per part, where $Sj \in R^{w \times h}$, $j \in \{1 \ldots J\}$. The set $L=(L_1, L_2, \ldots, L_C)$ has C vector fields, one per limb, where $L_C \in R^{w \times h \times 2}$, $c \in \{1 \ldots C\}$, each image location in $L_C$ encodes a two-dimensional vector.

Finally, the confidence maps and the affinity fields are parsed by greedy inference to output the two-dimensional key points for all subjects in the image.

The two-dimensional pose estimation method extracts joint heat maps as well as fields that represent the affinities between pairs of joints corresponding to bones, in order to associate the different joint candidates into instances of human poses.

The spatial resolution of a heat map may be lower than the input frame, due to the stride of the network. For instance, the architecture from the above-mentioned solution has a stride of 8, which leads to 46×46 heat maps for an input frame of size 368×368.

In practice, all heat maps $\mathcal{H}_j^t$ may be rescaled such that the heat maps have the same size by setting the smallest dimension to a threshold, for instance 64 pixels. In the following, the width and height of the heat map is denoted, after rescaling, by W and H respectively; i.e., min(W; H)=64. The heat maps values $\mathcal{H}_j^t$ [x;y] may also be clamped to the range [0; 1], as output values can be slightly below 0 or above 1 despite being trained to regress probabilities.

It is noted that the first sub step (a0) can be extended to any kind of heat map, such as the feature maps computed by convolutional neural networks for image recognition, object detection, or place recognition.

In a second sub step (a1), each heat map $\mathcal{H}_j^t$ is colorized as a function of the relative time t of the corresponding frame in the video. In other words, for each heat map $\mathcal{H}_j^t$ of dimension W×H is generated a corresponding colorized heat map $C_j^t$ of dimension W×H×C; i.e., with the same spatial resolution but C>1 channels.

As illustrated in FIG. 2, each key point position in frame 0 is colorized with the color, red. As the frames progress through the colorization process, each key point position is colorized with colorized swath that transitions from red to green.

For example, as illustrated in FIG. 2, each key point position in frame t is colorized with the color, yellow, yellowish red, or yellowish green. As further illustrated in FIG. 2, each key point position in frame T−1 is colorized with the color, green.

The C channels may be interpreted as color channels, for instance a colorized heat map $C_j^t$ with C=2 channels can be visualized as an image with red and green channels, and a colorized heat map $C_j^t$ with C=3 channels can be visualized as an image with red, green, and blue channels.

By contrast, the initial heat map $\mathcal{H}_j^t$ is a one channel image: i.e., a "greyscale." The action classification method is practical with C=2 or 3 because this colorization allows visualization by mapping each channel to RGB, but values of C exceeding 3 bring more efficient results.

By colorizing each key point position in each frame, the position of the key point can be defined with the x,y coordinates in the plot and the motion can be plotted in time by the color at the x,y coordinate. This use of color in the position plotting provides a pose (position) and motion (PoTion) representation of the key point in the video A color can be defined as a C-dimensional tuple $o \in [0;1]^C$; i.e., a pondered combination of the different channels. Sub-step (a2) preferably includes applying to each heat map $\mathcal{H}_j^t$, a C-dimensional colorization function $o(t)=(o_1(t), \ldots, o_C(t))$ dependent upon the relative time of the corresponding frame t in the video. In other words, the same color o(t) is applied to colorize the heat maps $\mathcal{H}_j^t$ for all key points j at a given frame t.

The colorized heat map value $C_j^t$ of a key point j at frame t, for a pixel (x;y) and a channel $c \in 〚1;C〛$, is thus given from the (initial one-channel) heat map value $\mathcal{H}_j^t$ by the formula $C_j^t[x;y;c] = o_c(t) \cdot \mathcal{H}_j^t[x;y]$, with $o_c(t)$ the c-th component of the C-dimensional colorization function o(t).

Different colorization schemes (i.e., definitions of o(t)) are possible. In particular, corresponding to various numbers of output channels C, examples have been illustrated by FIGS. 3 and 4.

Figure 3:
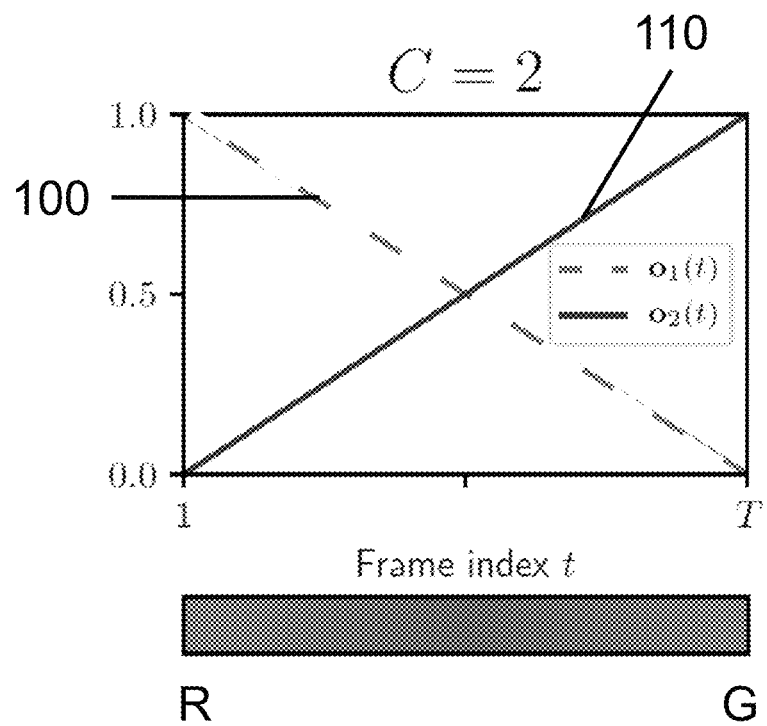
FIGS. 3 and 4 illustrates examples of colorizing functions.
Figure 4:
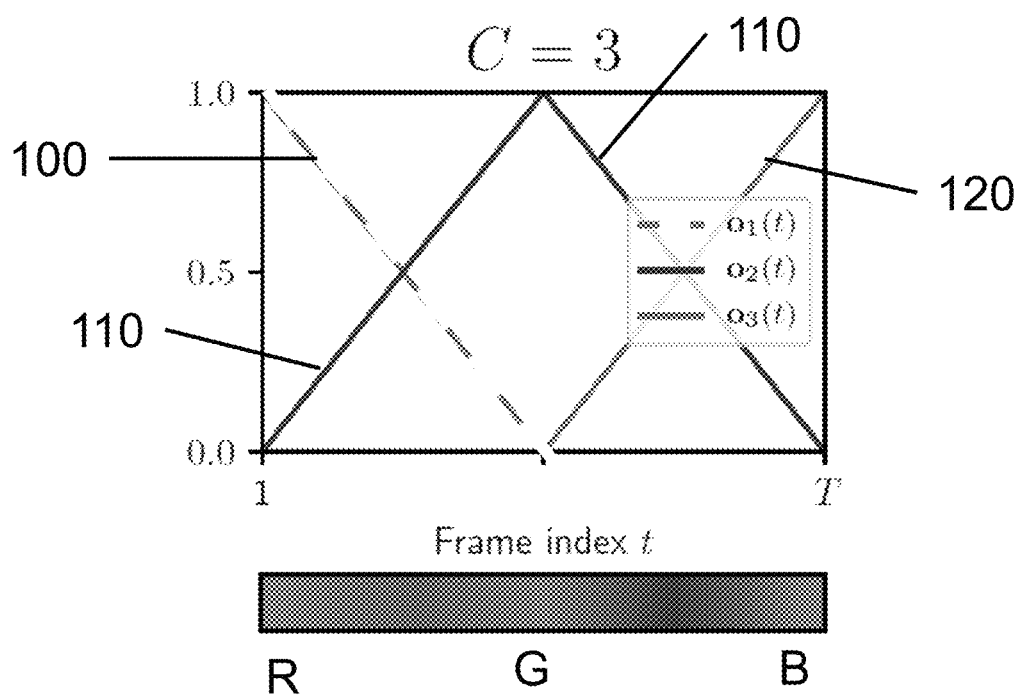

The top part of FIGS. 3 and 4 illustrates the components $o_1(t), \ldots, o_C(t)$, and the bottom part of FIGS. 3 and 4 displays the resulting color o(t).

Preferably, the function o(t) satisfies the following properties:

$\forall t_1, t_2 \in 〚1;T〛^2, \Sigma_{c=1}^C o_c(t_1) = \Sigma_{c=1}^C o_c(t_2)$: i.e., the sum of o(t) components is constant, in particular equal to one, for just "colorizing" the heat map; i.e., adding temporal information with the color and not altering the position estimation information when doing the above mentioned product;

$\forall c \in [\![1;C]\!]$, $o_c(t)$ is a continuous piecewise linear function of the relative time t; i.e., the color is linearly varying which allows representing realistically the passing time.

In FIG. 3, a colorization scheme for 2 channels is illustrated, wherein red ($o_1(t)$) (represented by dashed line 100) and green ($o_2(t)$) (represented by solid line 110) colors for channel 1 and 2 are used for visualization. As illustrated, the colorization scheme colorizes the first frame (t=1) in red, the last one (t=T) in green, and the middle one $$\left(t = \frac{T}{2} + 1\right)$$

with equal proportion (50%) of green and red. The exact proportion of red and green is a linear function of t: i.e., $$\frac{t-1}{T}.$$

In the example of FIG. 3, $$o_1(t) = 1 - \frac{t-1}{T} \text{ and } o_2(t) = \frac{t-1}{T}.$$

In FIG. 4, a colorization scheme for 3 channels is illustrated, wherein red ($o_1(t)$) (represented by dashed line 100), green ($o_2(t)$) (represented by solid line 110), and blue ($o_3(t)$) (represented by solid grey line 120) colors for channel 1, 2 and 3 are used for visualization. As illustrated, the colorization scheme colorizes the first frame (t=1) in red, the last one (t=T) in blue, and the middle one $$\left(t = \frac{T}{2} + 1\right)$$

in green. The exact proportion of red and green is a linear function of t: i.e., $$2\frac{t-1}{T}.$$

In the example of FIG. 4, the linear functions are:

$$o_1(t) = \begin{cases} 2\left(1 - \frac{t-1}{T}\right) & \text{if } t \leq \frac{T}{2} + 1 \\ 0 & \text{if } t \geq \frac{T}{2} + 1 \end{cases},$$

$$o_2(t) = \begin{cases} 2\frac{t-1}{T} & \text{if } t \leq \frac{T}{2} + 1 \\ 2\left(1 - \frac{t-1}{T}\right) & \text{if } t \geq \frac{T}{2} + 1 \end{cases}, \text{ and}$$

$$o_3(t) = \begin{cases} 0 & \text{if } t \leq \frac{T}{2} + 1 \\ 2\frac{t-1}{T} & \text{if } t \geq \frac{T}{2} + 1 \end{cases}.$$

In both examples, colors can be swapped indistinctly; i.e., components $o_1(t), \ldots, o_C(t)$ permuted (if C=2, one of $o_1(t)$ and $o_2(t)$ is $$\frac{t-1}{T}$$

and the other is $$1 - \frac{t-1}{T};$$

if C=3 one of $o_1(t)$, $o_2(t)$ and $o_3(t)$ is $$\begin{cases} 2\left(1 - \frac{t-1}{T}\right) & \text{if } t \leq \frac{T}{2} + 1 \\ 0 & \text{if } t \geq \frac{T}{2} + 1 \end{cases},$$

another is $$\begin{cases} 0 & \text{if } t \leq \frac{T}{2} + 1 \\ 2\frac{t-1}{T} & \text{if } t \geq \frac{T}{2} + 1 \end{cases},$$

and the last one is $$\begin{cases} 2\frac{t-1}{T} & \text{if } t \leq \frac{T}{2} + 1 \\ 2\left(1 - \frac{t-1}{T}\right) & \text{if } t \geq \frac{T}{2} + 1 \end{cases}.$$

This colorization scheme can be extended to any number of color channels C, wherein the T frames are split into C−1 regularly sampled intervals.

In each k-th interval, $k \in [\![1;C-1]\!]$, $o_k(t)$ decreases from 1 to 0, $o_{k+1}(t)$ increases from 0 to 1, and any other $o_c(t)$ stays equal to 0 (other maximal values than 1 could be used). It is noted that all the variations may be linear or non-linear.

The components may also be determined recursively: in the first C−2 interval, can be applied the coloring scheme for C−1 channels, and in the last channel $o_{C-1}(t)$ decrease from 1 to 0, $o_C(t)$ increase from 0 to 1, and any other $o_c(t)$ stays equal to 0.

In sub step (a2), the data processing processor 21 of the first server 20 aggregates all the colorized heat maps $C_j^t$ of a key point j (i.e., for the different frames t) into at least one image $S_j$, $U_j$, $I_j$, $N_j$ representing the evolution of the position estimation of the key point j during the video.

This aggregation is performed for each key point $j \in [\![1;n]\!]$. The images $S_j$, $U_j$, $I_j$, $N_j$ are simultaneous representations of appearance and motion.

For example, as illustrated in FIG. 2, the image for the nose key point, after aggregation, shows, in the color red, the nose key point initially being positioned on the right side of the image. The nose key point then transitions to the left side (negative x-direction) of the image (represented by the color green), with the nose key point transitioning in a positive y-direction and then a negative y-direction. This is consistent with the image of the human subject as the images transitions from frame 0 to frame T−1.

As illustrated in FIG. 2, the human subject starts on the right side of the image, jumps, and ends up on the left side of the image. Such actions would create the position/motion image as illustrated in FIG. 2.

As it will be explained in more detail below, different ways of aggregating the colorized heat maps $C_j^t$ are possible, and in particular up to four types of the images can be processed (1) a raw image $S_j$, (2) a first normalized image $U_j$, (3) an intensity image $I_j$, and (4) a second normalized image $N_j$.

All of the four types of images represent the evolution of the position estimation of the key point j during the video, and are excellent candidates for PoTion.

It is understood that any number of these types of images can be generated in sub step (a2), either sequentially, or directly.

For instance, the four types are generated as consecutives stages, each stage from the previous one.

It is understood that a skilled person may, for example, prefer to directly generate the second normalized image $N_j$ as PoTion representation by using a suitable formula.

The raw image $S_j$ is a C-channel image (of dimension W×H×C) which can be easily obtained by summing colorized heat maps $C_j^t$ over the frames t: $S_j = \Sigma_{t=1}^T C_j^t$.

It is noted that the values of $S_j$ are increasing with the number of frames T because of the sum: the longer the video is, the higher the average value of $S_j$ over the pixels will be.

To obtain an invariant representation, sub step (a2) includes, for each raw image $S_j$, the normalization of the raw image $S_j$ into a (still C-channels) first normalized image $U_j$. For example, for each channel c, the summed heat map value is independently normalized by dividing by the maximum value over all pixels; i.e., $$U_j[x; y; c] = \frac{S_j[x; y; c]}{\max_{x',y'} S_j[x'; y'; c]}.$$

Alternatively, the normalization may be performed by dividing by the sum of colorization components $o_c(t)$ over all frames; i.e., $$U_j[x; y; c] = \frac{S_j[x; y; c]}{\sum_{t=1}^T o_c(t)}.$$

Figure 5:
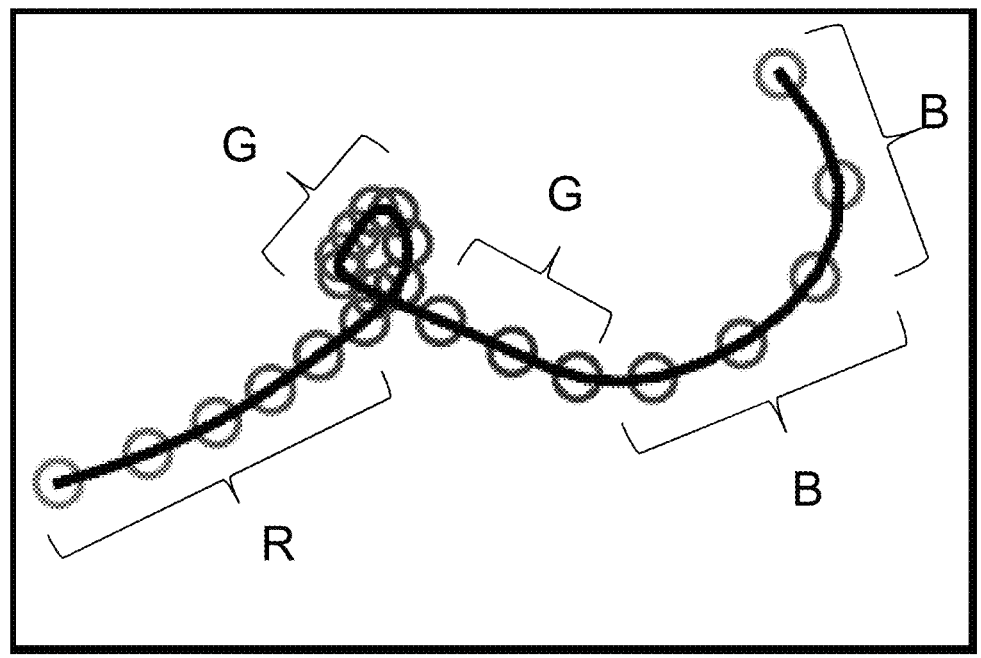
FIG. 5 illustrates an example motion of a key point.
Figure 6:
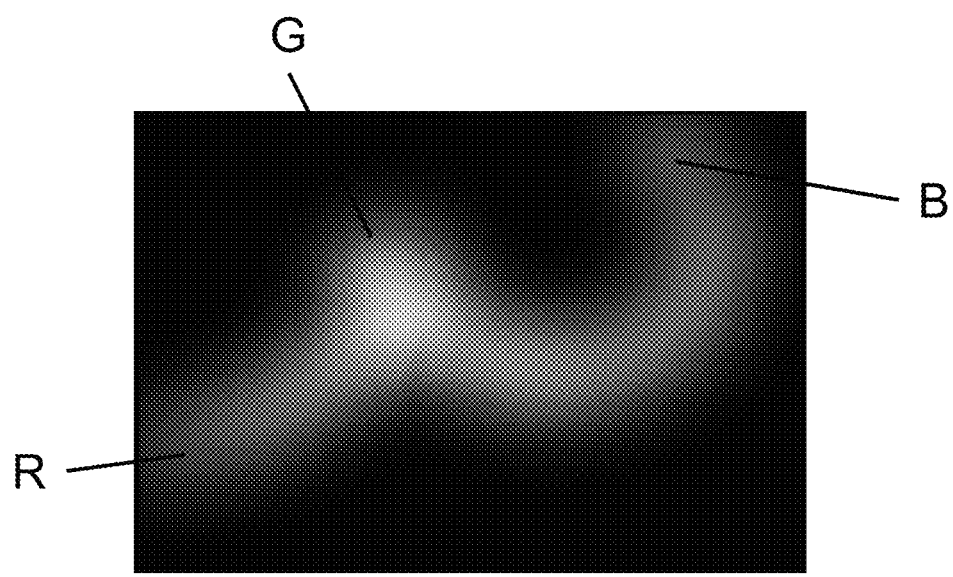
FIGS. 6 through 8 illustrate, respectively, the corresponding first normalized image, intensity image, and second normalized images of the motion illustrated in FIG. 5.

For example, a motion of a key point, the key point being illustrated in FIG. 5, representing the obtained corresponding 3-channels first normalized image $U_j$ is illustrated in FIG. 6. The temporal evolution of the key point position can be encoded with the color to be easily visible. It is noted that FIG. 6 would be colorized with red (R) transitioning to green (G) transitioning to blue (B).

As illustrated in FIG. 5, the position of the key point originates on the left side of the image and colorized in red and transitions to green as the position of the key point enters the loop. The position of the key point in the loop is colorized with a green color, and as the position of the key point leaves the loop, the position of the key point is colorized with a transition from green to blue. Finally, as the position of the key point enters the hook, the position of the key point is colorized blue.

The first normalized image $U_j$ can be used efficiently as a PoTion representation of the evolution of the position estimation of the key point j during the video. However, it is to be noted that if a key point stays at a given position for some time, a stronger intensity will be obtained (middle of the trajectory G in the example of FIG. 6). This phenomenon could be detrimental, so sub step (a2) may include a second part, so as to further normalize the intensity.

In this second part, sub step (a2) includes, for each first normalized image $U_j$, the aggregation of the C channels of first normalized image $U_j$ into a 1-channel intensity image $I_j$. This representation has no information about temporal ordering (it is a "greyscale" image), but encodes how much time a pixel stays at each location.

Figure 7:
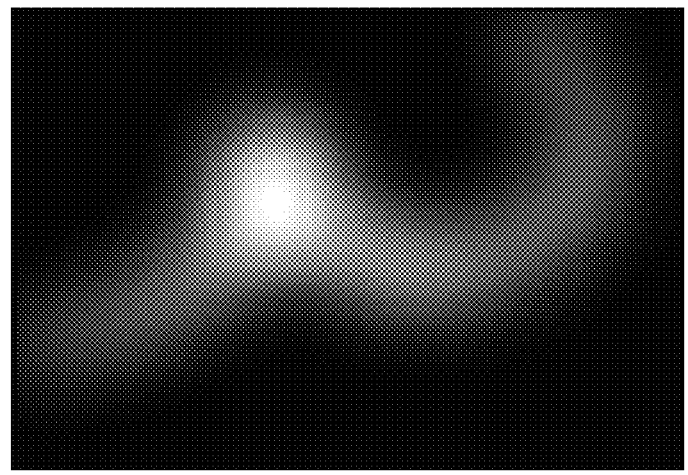

Each intensity image $I_j$ can be determined by summing over the channels c the corresponding first normalized image $U_j$. In other words, the intensity image value $I_j$ of a key point j for a pixel (x;y) is given by the formula $I_j[x;y] = \Sigma_{c=1}^C U_j[x;y;c]$. The corresponding example of intensity image $I_j$ is shown by FIG. 7.

To obtain a fully normalized representation, sub step (a2) includes, for each first normalized image $U_j$, the further normalization of the first normalized image $U_j$ into a (still C-channels) second normalized image $N_j$ (which can be considered as a "doubly" normalized image), as a function of the corresponding intensity image $I_j$.

For example, the first normalized image $U_j$ can be divided by the intensity image $I_j$: i.e., $$N_j[x; y; c] = \frac{U_j[x; y; c]}{\varepsilon + I_j[x; y]},$$

with a parameter for avoiding instability in areas with low intensity (in particular $\varepsilon = 1$).

In the second normalized image $N_j$, all locations of the motion trajectory are weighted equally, regardless of the amount of time spent at each location. Momentary stops in the trajectory are weighted more than other trajectory locations in $U_j$ and $I_j$. The division in the above formula cancels out this effect.

Figure 8:
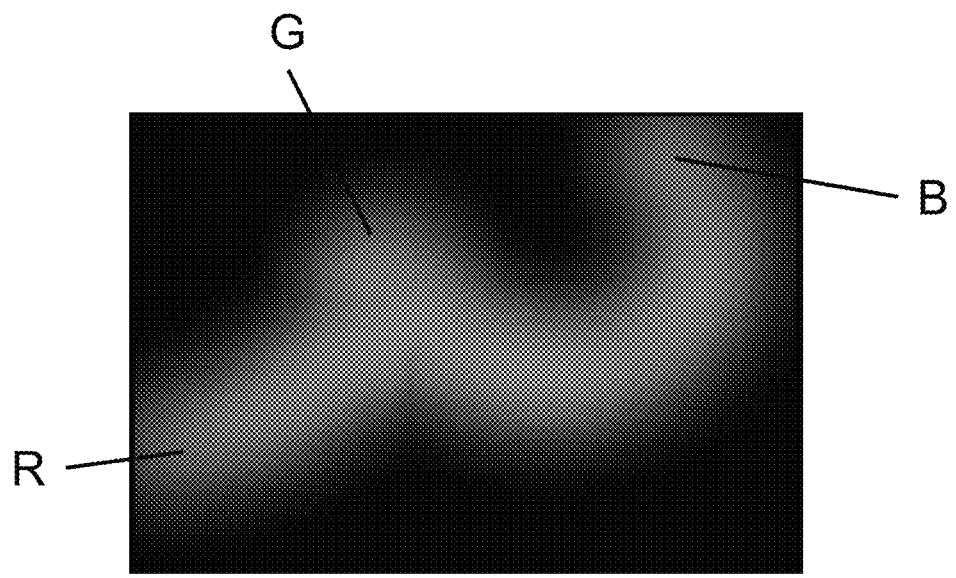

The corresponding example of second normalized image $N_j$ is shown by FIG. 8. It can be observed that the "loop" part has no abnormal over-intensity.

This second normalized image $N_j$ can thus be used as a PoTion representation of the evolution of the position estimation of a key point j during the video.

It is noted that the first normalized image $U_j$, the intensity image $I_j$, and the second normalized image $N_j$ may be together considered as suitable PoTion representations; i.e., representations of the evolution of the position estimation of a key point during the video, and combined, for example by stacking. Alternatively or in addition, the raw image $S_j$ can be considered.

After completing sub steps (a0) through (a2), the convolutional neural network is properly trained using the obtained PoTion representations. Training is defined as the determination of the optimal values of parameters and weights of the convolutional neural network. As it will be explained in more detail below, the training may not include any pre-training.

The sets, associated with each training video, of images $S_j$, $U_j$, $I_j$, $N_j$ representing the evolution of the position estimation of each key point during the video are used as input to the convolutional neural network.

Alternatively, for each training video, the corresponding input of the convolutional neural network is composed of the corresponding images $S_j$, $U_j$, $I_j$, $N_j$ stacked for all key points $j \in [\![1;n]\!]$, into a "global" image representing the evolution of the position estimation of all key points during the video.

Since the PoTion representation has significantly less texture than standard images, the network architecture does not need to be deep and does not require any pre-training. Hence, any known conventional convolutional neural network architecture may be effectively used.

More specifically, the convolutional neural networks generally contain four types of layers processing the information: (1) the convolution layer which processes blocks of the image one after the other; (2) the nonlinear layer (also called correction layer) which allows pertinence of the result to be improved by applying an "activation function;" (2) the pooling layer which allows the grouping together of several neurons in one single neuron; and (4) the fully connected layer that connects all the neurons of a layer with all the neurons of the preceding layer.

The convolutional neural network may also include batch normalization layers to accelerate learning of data.

The activation function of the nonlinear layer uses a conventional Rectified Linear Unit function which is equal to $f(x)=\max(0, x)$, and the pooling layer uses a MaxPool2×2 function which corresponds to a maximum between four values of a square (four values are pooled into one), but other polling functions such as AveragePool or SumPool can be used.

The convolution layer and the fully connected layer generally correspond to a scalar product between the neurons of the preceding layer and the weights of the convolutional neural network.

A typical convolutional neural network architecture stacks a few pairs of convolution layers (CONV) and nonlinear layers (RELU) and then adds a pooling layer (POOL); i.e., forming a layer group consisting of a convolution layer, a nonlinear layer, a convolution layer, a nonlinear layer, a convolution layer, a nonlinear layer, and a pooling layer.

The convolutional neural network architecture repeats this layering scheme until a sufficiently small output vector is obtained, and terminate with one or two fully connected layers.

A typical convolutional neural network architecture: may be INPUT→[[CONV→RELU]p→POOL]n→FC, wherein p is the number of convolution layer and non linear layer pairs and n is the number layer groups.

Figure 9:
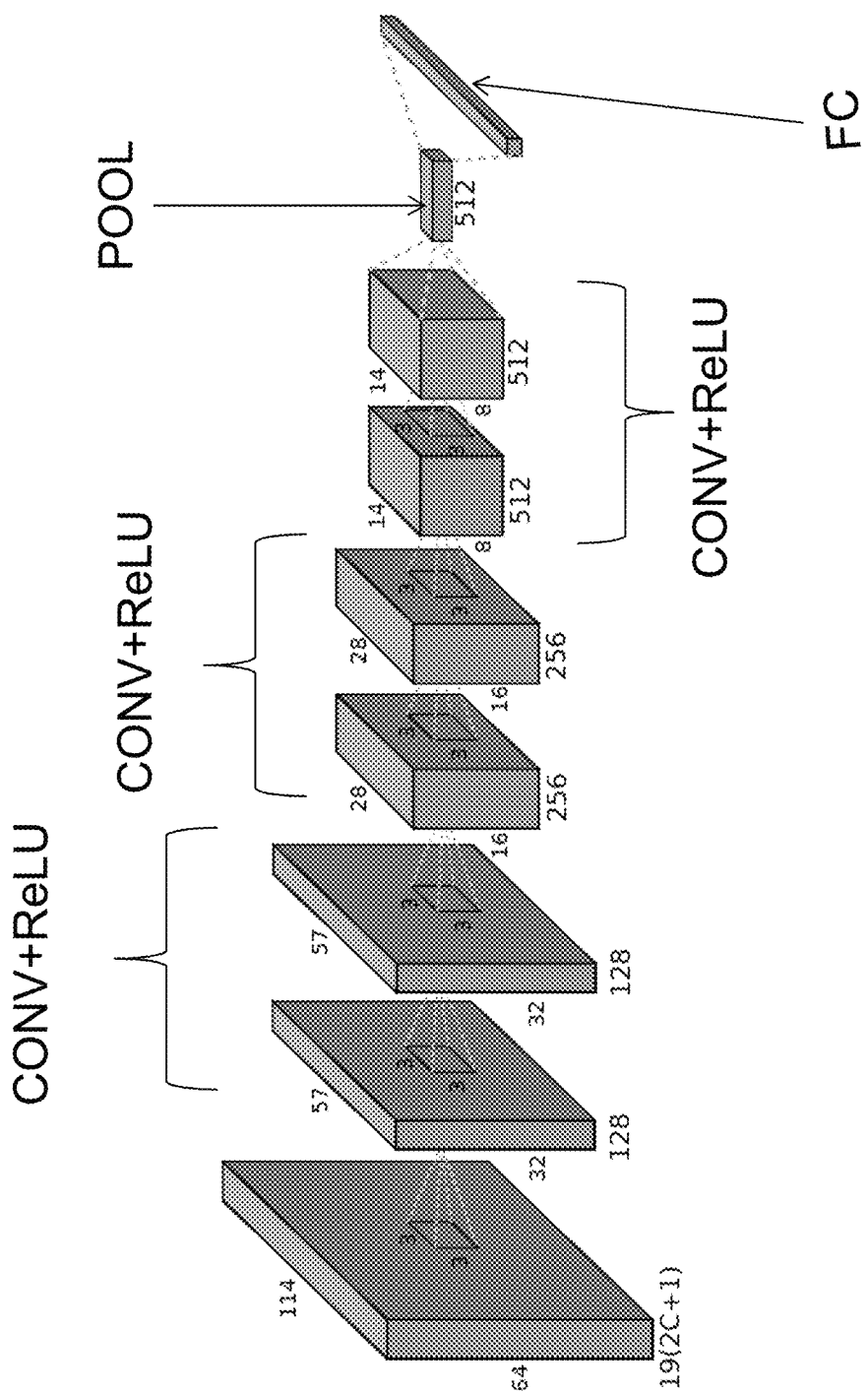
FIG. 9 illustrates an example of a convolutional neural network architecture for use in a human action recognition method.

The convolutional neural network used advantageously may include six convolutional layers and one fully-connected layer, as represented by FIG. 9, which illustrates an overview of a convolutional neural network architecture.

Each convolutional layer CONV is followed by a batch normalization layer and a ReLU non-linearity layer. A batch size of 32 can be used. After three blocks, the convolutional neural network comprises a global average pooling layer POOL followed by a fully-connected layer FC with soft-max to perform video classification.

In one example, wherein there are eighteen (18) human joint key points localized (i.e., nineteen (19) with the background) and the first normalized image $U_j$, the intensity image $I_j$, and the second normalized image $N_j$ are considered, the number of input channels is (19×(2C+1)) channels (as the first normalized image $U_j$ and the second normalized image $N_j$ have both C channels and the intensity image $I_j$ one channel).

All convolutions have, for example, a kernel size of three (3), the first one with a stride of two (2) and the second one with a stride of one (1). Consequently, at the beginning of each block, the spatial resolution of the feature maps is divided by two.

When the spatial resolution is reduced, the number of channels is doubled at the same time, starting with 128 channels for the first block, 256 channels for the second block, and 512 channels for the third block.

It is noted that the number of blocks, the number of convolutional layers per block, and the number of channels may vary.

It is noted that all layer weights can be initialized with the following heuristic:

$$W_{ij} \sim U\left[-\frac{1}{\sqrt{n}}, \frac{1}{\sqrt{n}}\right]$$

wherein $U[-a, a]$ is the uniform distribution in the interval $(-a, a)$ and n is the size of the previous layer (the number of columns of W).

As noted above, the disclosed convolutional neural network, which takes, as input, the PoTion representation, can be trained from scratch.

During training, for example, dropped activations with a probability of 0.25 are dropped after each convolutional layer. The network may be optimized, for example, using stochastic optimization.

Once the PoTion representation has been preprocessed for every training video of the dataset (i.e., after step (a) of FIG. 2), training of the convolutional neural network on a NVIDIA Titan X GPU, using a dataset containing 6,766 video clips from 51 classes, such as brush hair, sit, or swing baseball, takes approximately four (4) hours. In other words, the video classification training can be done in a few hours on a single GPU without any pre-training.

Conventionally, training often requires multiple days on several GPUs with pre-training.

Data augmentation is known to play a central role in convolutional neural network training. By randomly flipping the inputs at training, performance can be significantly improved, as is typically the case with image and action classification. It is noted that, in the example of human joints, data augmentation can be realized by horizontally flipping the PoTion representation, as well as, swapping the channels that correspond to the left and the right joints (because of the human symmetry).

The skilled person could realize data augmentation by utilizing other strategies, such as smoothing the heat maps, shifting the heat maps by a few pixels randomly for each joint: i.e., adding small amount of random spatial noise, or doing random cropping.

As discussed above, an inputted video classification method implemented by the data processor 31 of the second server 30 to classify an action performed by a subject in an inputted video. The video to be classified can be received from the client equipment 10.

As noted above, at the first step (a), the training of a convolutional neural network is performed by the first server 20 (from a base of training videos depicting the subject performing already classified actions). The training is realized by, for each training video, a PoTion representation (as already explained a set of images $S_j$, $U_j$, $I_j$, $N_j$—possibly stacked—representing the evolution of the position estimation of key points j during the video) is generated and the training is performed on the basis of these representations.

It is understood that the first and second servers may be the same server. Additionally, it is understood that step (a) may include the transmission of the trained convolutional neural network parameters and weights from the first server 20 to the second server 30 for storage in the memory 22.

In the inputted video classification method, the data processor 31 of the second server 30 generates a PoTion representation of the inputted video.

More specifically, the data processor 31 of the second server 30 (1) generates, for each frame $t \in [\![1;T]\!]$ of the inputted video, for each key point $j \in [\![1;n]\!]$ of the subject, a heat map $\mathcal{H}_j^t$ of the key point j representing a position estimation of the key point j within the frame t; (2) colorizing each heat map $\{\mathcal{H}_j^t\}_{t \in [\![1;T]\!], j \in [\![1;n]\!]}$ as a function of the relative time of the corresponding frame t in the video; and (3) aggregates, for each key point $j \in [\![1;n]\!]$, all the colorized heat maps $C_j^t$ of the key point j into an image $S_j$, $U_j$, $I_j$, $N_j$ representing the evolution of the position estimation of the key point j during the video.

It is noted that the colorization and the aggregation processes may include any refinement thereof. It is to be noted that the inputted video classification method may implement the trimming of the inputted video (so that it only contains a single action to be recognized).

Thereafter (aggregation), the data processor 31 of the second server 30 classifies the inputted video with the convolutional neural network using as input the set of images $S_j$, $U_j$, $I_j$, $N_j$ representing the evolution of the position estimation of each key point j during the video. The obtained classification result can be transmitted back to the client equipment 10.

Figure 10:
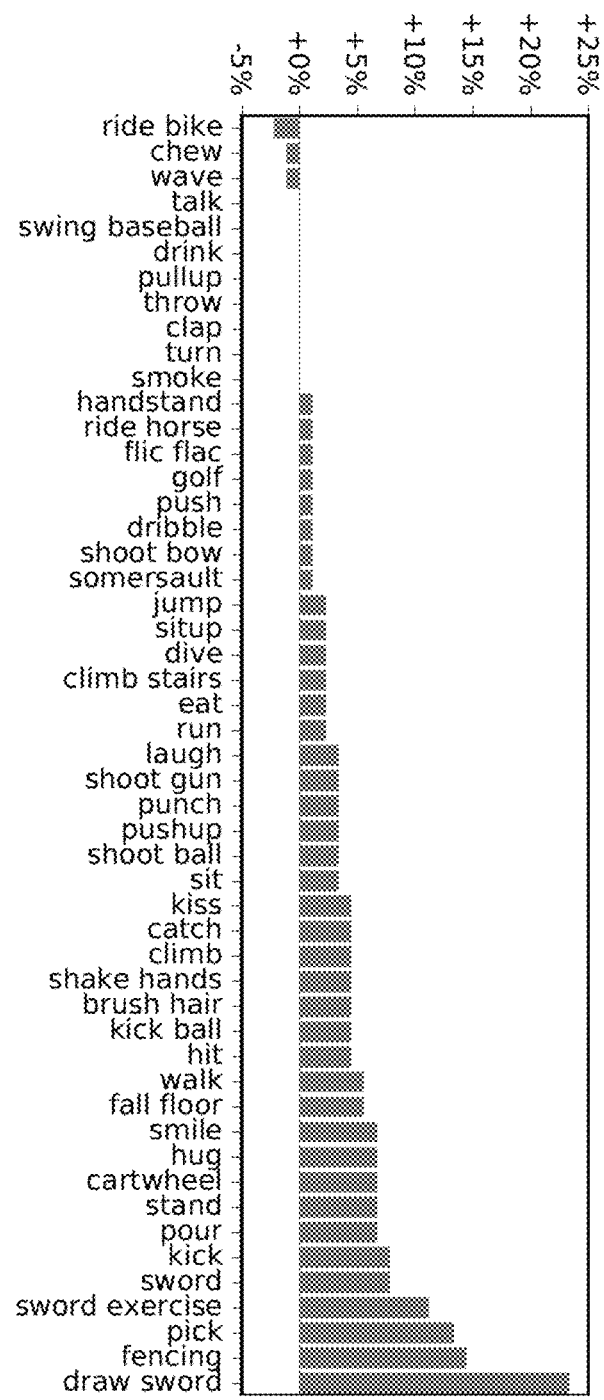
FIG. 10 illustrates the efficiency of the human action recognition method utilizing the convolutional neural network architecture of FIG. 9 with respect to conventional human action recognition methods.

FIG. 10 shows that the classification accuracy significantly improves for nearly all classes over a classification based on an inflated three-dimensional convolutional neural network.

It is noted that some classes (such as talk, drink, pullup, etc.) are already perfectly classified, thus no further gain is possible.

It is further noted that the classes with the largest gain are often related to a large motion of the upper body joints. For instance, four classes that involves a movement with a sword (draw sword, fencing, sword, and sword exercise) are among the classes that benefit most from the present PoTion representation.

It appears that the relative positions of the body parts involved in these complex movements over the full action are important for recognition. The PoTion representation gracefully encodes long-term dependencies and thus provides an adequate description and improves classification for such classes.

It is note that the action classification training and the actual action classification can be realized by executing a computer program product, comprising code instructions, using the data processor of the servers.

In summary, a method, using a data processor, for training, using a plurality of training videos, each training video depicting a subject performing already classified actions, a convolution neural network to classify actions performed by subjects in a target video comprises: (a) generating, for each frame ($t \in [\![1;T]\!]$) of the training video, for each key point ($j \in [\![1;n]\!]$) of the subject, a heat map ($\mathcal{H}_j^t$) of the key point (j) representing a position estimation of the key point (j) within the frame (t); (b) colorizing each heat map ($\{\mathcal{H}_j^t\}_{t \in [\![1;T]\!], j \in [\![1;n]\!]}$) as a function of a relative time of a corresponding frame (t) in the video; (c) aggregating, for each key point ($j \in [\![1;n]\!]$), all the colorized heat maps ($C_j^t$) of the key point (j) into at least one image ($S_j$, $U_j$, $I_j$, $N_j$) representing an evolution of a position estimation of the key point (j) during the video; and (d) training the convolutional neural network using, as input, the sets associated with each training video of images ($S_j$, $U_j$, $I_j$, $N_j$) representing the evolution of the position estimation of each key point (j) during the video.

The colorizing of each heat map may apply, to each heat map ($\mathcal{H}_j^t$), a C-dimensional colorization function (o(t)=($o_1$(t), . . . , $o_C$(t))) depending on the relative time of the corresponding frame (t) in the video.

The T frames may be split into C−1 intervals, the C-dimensional colorization function (o(t)) being defined so that in each k-th interval, $k \in [\![1;C-1]\!]$, the k-th component ($o_k$(t)) of the C-dimensional colorization function (o(t)) decreasing from 1 to 0, the k+1-th component ($o_{k+1}$(t)) of the C-dimensional colorization function (o(t)) increasing from 0 to 1, and any other component ($o_c$(t)) of the C-dimensional colorization function (o(t)) remains equal to 0.

The components $o_c$(t), $c \in [\![1;C]\!]$ of the C-dimensional colorization function o(t) may satisfy the following properties: $\forall t_1, t_2 \in [\![1;T]\!]^2$, $\sum_{c=1}^{C} o_c(t_1) = \sum_{c=1}^{C} o_c(t_2)$; and $\forall c \in [\![1;C]\!]$, $o_c$(t) being a continuous piecewise linear function.

The colorized heat map value $C_j^t$ of a key point j at frame t for a pixel (x;y) and a channel $c \in [\![1;C]\!]$ may be given from the heat map value $\mathcal{H}_j^t$ by the formula $C_j^t[x;y;c] = o_c(t) \cdot \mathcal{H}_j^t[x;y]$, with $o_c$(t) the c-th component of the C-dimensional colorization function o(t).

The colorizing of each heat map may include, for each key point ($j \in [\![1;n]\!]$), determining a raw image ($S_j$) by summing colorized heat maps ($C_j^t$) of the key point (j) over the frames (t).

The colorizing of each heat map may include, for each raw image ($S_j$), the normalization of the raw image ($S_j$) into a first normalized image ($U_j$).

The first normalized image $U_j$ value of a key point j for a pixel (x;y) and a channel c may be given from the corresponding raw image $S_j$ value by the formula $$U_j^t[x;y;c] = \frac{S_j^t[x;y;c]}{\max_{x',y'} S_j^t[x';y';c]}.$$

The colorizing of each heat map may include, for each first normalized image ($U_j$), the aggregation of the C channels of first normalized image ($U_j$) into a 1-channel intensity image ($I_j$).

Each intensity image ($I_j$) may be determined by summing over the channels (c) the corresponding first normalized image ($U_j$).

The colorizing of each heat map may include, for each first normalized image ($U_j$), the further normalization of the first normalized image ($U_j$) into second normalized image ($N_j$), as a function of the corresponding intensity image ($I_j$).

The second normalized image $N_j$ value of a key point j for a pixel (x;y) and a channel c may be given from the corresponding first normalized image $U_j$ value and the intensity image $I_j$ value by the formula $$N_j[x; y; c] = \frac{U_j[x; y; c]}{\varepsilon + I_j[x; y]}.$$

The training of the convolutional neural network may include, for each training video, stacking the set of images ($S_j$, $U_j$, $I_j$, $N_j$) associated to the training video, into a global image representing the evolution of the position estimation of all key points (j) during the video, for use, as input, to the convolutional neural network.

A method, using a data processor, for classifying, using a convolution neural network, an action performed by a subject in an inputted video, comprises: (a) generating, for each frame (t∈[[1;T]]) of the inputted video, for each key point (j∈[[1;n]]) of the subject, a heat map ($\mathcal{H}_j^t$) of the key point (j) representing a position estimation of the key point (j) within the frame (t); (b) colorizing each heat map ($\{\mathcal{H}_j^t\}_{t\in[[1;T]], j\in[[1;n]]}$) as a function of a relative time of a corresponding frame (t) in the inputted video; (c) aggregating, for each key point (j∈[[1;n]]), all the colorized heat maps ($C_j^t$) of the key point (j) into at least one image ($S_j$, $U_j$, $I_j$, $N_j$) representing an evolution of a position estimation of the key point (j) during the inputted video; and (d) classifying, using the convolutional neural network, an action in the inputted video, using, as input, a set of images ($S_j$, $U_j$, $I_j$, $N_j$) representing the evolution of the position estimation of each key point (j) during the inputted video.

The convolution neural network, may be trained, using a plurality of training videos, each training video depicting a subject performing already classified actions, to classify actions performed by subjects in a target video, the training of the convolution neural network including (i) generating, for each frame (t∈[[1;T]]) of the training video, for each key point (j∈[[1;n]]) of the subject, a heat map ($\mathcal{H}_j^t$) of the key point (j) representing a position estimation of the key point (j) within the frame (t), (ii) colorizing each heat map ($\{\mathcal{H}_j^t\}_{t\in[[1;T]], j\in[[1;n]]}$) as a function of a relative time of a corresponding frame (t) in the video, (iii) aggregating, for each key point (j∈[[1;n]]), all the colorized heat maps ($C_j^t$) of the key point (j) into at least one image ($S_j$, $U_j$, $I_j$, $N_j$) representing an evolution of a position estimation of the key point (j) during the video; and (iv) training the convolutional neural network using, as input, the sets associated with each training video of images ($S_j$, $U_j$, $I_j$, $N_j$) representing the evolution of the position estimation of each key point (j) during the video.

The colorizing of each heat map may include applying, to each heat map ($\mathcal{H}_j^t$), a C-dimensional colorization function (o(t)=($o_1$(t), ..., $o_C$(t))) depending on the relative time of the corresponding frame (t) in the video.

The T frames may be split into C−1 intervals, the C-dimensional colorization function (o(t)) being defined so that in each k-th interval, k∈[[1;C−1]], the k-th component ($o_k$(t)) of the C-dimensional colorization function (o(t)) decreasing from 1 to 0, the k+1-th component ($o_{k+1}$(t)) of the C-dimensional colorization function (o(t)) increasing from 0 to 1, and any other component ($o_c$(t)) of the C-dimensional colorization function (o(t)) remains equal to 0.

The components $o_c$(t), c∈[[1;C]] of the C-dimensional colorization function o(t) may satisfy the following properties:

$$\forall t_1, t_2 \in [[1; T]]^2, \sum_{c=1}^{C} o_c(t_1) = \sum_{c=1}^{C} o_c(t_2);$$

∀ c ∈ [[1; C]], $o_c(t)$ being a continuous piecewise linear function.

The colorized heat map value $C_j^t$ of a key point j at frame t for a pixel (x;y) and a channel c∈[[1;C]] may be given from the heat map value $\mathcal{H}_j^t$ by the formula $C_j^t[x;y;c]=o_c(t)\cdot \mathcal{H}_j^t[x;y]$, with $o_c$(t) the c-th component of the C-dimensional colorization function o(t).

The colorizing of each heat map may include, for each key point (j∈[[1;n]]), determining a raw image ($S_j$) by summing colorized heat maps ($C_j^t$) of the key point (j) over the frames (t).

The colorizing of each heat map may include, for each raw image ($S_j$), the normalization of the raw image ($S_j$) into a first normalized image ($U_j$).

The first normalized image $U_j$ value of a key point j for a pixel (x;y) and a channel c may be given from the corresponding raw image $S_j$ value by the formula $$U_j^t[x; y; c] = \frac{S_j^t[x; y; c]}{\max_{x', y'} S_j^t[x'; y'; c]}.$$

The colorizing of each heat map may include, for each first normalized image ($U_j$), the aggregation of the C channels of first normalized image ($U_j$) into a 1-channel intensity image ($I_j$).

Each intensity image ($I_j$) may be determined by summing over the channels (c) the corresponding first normalized image ($U_j$).

The colorizing of each heat map may include, for each first normalized image ($U_j$), the further normalization of the first normalized image ($U_j$) into second normalized image ($N_j$), as a function of the corresponding intensity image ($I_j$).

The training of the convolutional neural network may include, for each training video, stacking the set of images ($S_j$, $U_j$, $I_j$, $N_j$) associated to the training video, into a global image representing the evolution of the position estimation of all key points (j) during the video, for use, as input, to the convolutional neural network.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method, using a data processor, for training, using a plurality of training videos, each training video depicting a subject performing already classified actions, a convolution neural network to classify actions performed by subjects in a target video, comprising:

(a) generating, for each frame (t∈[[1;T]]) of the training video, for each key point (j∈[[1;n]]) of the subject, a heat map ($\mathcal{H}_j^t$) of the key point (j) representing a position estimation of the key point (j) within the frame (t);

(b) colorizing each heat map ($\{\mathcal{H}_j^t\}_{t\in[\![1;T]\!], j\in[\![1;n]\!]}$) as a function of a relative time of a corresponding frame (t) in the video;

(c) aggregating, for each key point (j∈[[1;n]]), all the colorized heat maps ($c_j^t$) of the key point (j) into at least one image ($S_j, U_j, I_j, N_j$) representing an evolution of a position estimation of the key point (j) during the video; and (d) training the convolutional neural network using, as input, the sets associated with each training video of images ($S_j, U_j, I_j, N_j$) representing the evolution of the position estimation of each key point (j) during the video.

2. The method as claimed in claim 1, wherein the colorizing of each heat map includes applying, to each heat map ($\mathcal{H}_j^t$), a C-dimensional colorization function (o(t)=$o_1$(t), . . . , $o_C$(t))) depending on the relative time of the corresponding frame (t) in the video.

3. The method as claimed in claim 2, wherein the r frames are split into c−1 intervals, the C-dimensional colorization function (o(t) being defined so that in each k-th interval, k∈ [[1;C−1]], the k-th component ($o_k$(t)) of the C-dimensional colorization function (o(t)) decreasing from 1 to 0, the k+1-th component ($o_{k+1}$(t)) of the C-dimensional colorization function (o(t) increasing from 0 to 1, and any other component ($o_c$(t)) of the C-dimensional colorization function (o(t)) remains equal to 0.

4. The method as claimed in claim 3, wherein the components $o_c(t), c\in[1;C]$ of the C-dimensional colorization function o(t) satisfy the following properties:

$$\forall t_1, t_2 \in [\![1;T]\!]^2, \sum_{c=1}^{C} o_c(t_1) = \sum_{c=1}^{C} o_c(t_2);$$

$\forall c \in [\![1;C]\!]$, $o_c(t)$ being a continuous piecewise linear function.

5. The method as claimed in claim 2, wherein the colorized heat map value $C_j^t$ of a key point j at frame t for a pixel (x;y) and a channel c∈[1;C] is given from the heat map value $\mathcal{H}_j^t$ by the formula $C_j^t[x:y:c] = o_c(t) \cdot \mathcal{H}_j^t[x:y]$, with $o_c(t)$ the c-th component of the C-dimensional colorization function o(t).

6. The method as claimed in claim 3, wherein the colorized heat map value $C_j^t$ of a key point j at frame t for a pixel (x:y) and a channel c∈[1;C] is given from the heat map value by the formula $\mathcal{H}_j^t$ by the formula $C_j^t[x:y:c] = o_c(t) \cdot \mathcal{H}_j^t[x:y]$, with $o_c(t)$ the c-th component of the C-dimensional colorization function o(t).

7. The method as claimed in claim 4, wherein the colorized heat map value $C_j^t$ of a key point j at frame t for a pixel (x:y) and a channel c∈[1:C] is given from the heat map value $\mathcal{H}_j^t$ by the formula $C_j^t[x:y:c] = o_c(t) \cdot \mathcal{H}_j^t[x:y]$, with $o_c(t)$ the c-th component of the C-dimensional colorization function o(t).

8. The method as claimed in claim 1, wherein the colorizing of each heat map includes, for each key point (j∈[1:n]), determining a raw image ($S_j$) by summing colorized heat maps ($C_j^t$) of the key point (j) over the frames (t).

9. The method as claimed in claim 8, wherein the colorizing of each heat map includes, for each raw image ($S_j$), the normalization of the raw image ($S_j$) into a first normalized image ($U_j$).

10. The method as claimed in claim 9, wherein the first normalized image $U_j$ value of a key point j for a pixel (x:y) and a channel is given from the corresponding raw image $S_j$ value by the formula $$U_j^t[x;y;c] = \frac{S_j^t[x;y;c]}{\max_{x',y'} S_j^t[x';y';c]}.$$

11. The method as claimed in claim 9, wherein the colorizing of each heat map includes, for each first normalized image ($U_j$), the aggregation of the c channels of first normalized image ($U_j$) into a 1-channel intensity image ($I_j$).

12. The method as claimed in claim 10, wherein the colorizing of each heat map includes, for each first normalized image ($U_j$), the aggregation of the c channels of first normalized image ($U_j$) into a 1-channel intensity image ($I_j$).

13. The method as claimed in claim 11, wherein each intensity image ($I_j$) is determined by summing over the channels (c) the corresponding first normalized image ($U_j$).

14. The method as claimed in claim 11, wherein the colorizing of each heat map includes, for each first normalized image ($U_j$), the further normalization of the first normalized image ($U_j$) into second normalized image ($N_j$), as a function of the corresponding intensity image ($I_j$).

15. The method as claimed in claim 12, wherein the colorizing of each heat map includes, for each first normalized image ($U_j$), the further normalization of the first normalized image ($U_j$) into second normalized image ($N_j$), as a function of the corresponding intensity image ($I_j$).

16. The method as claimed in claim 14, wherein the second normalized image $N_j$ value of a key point j for a pixel (x:y) and a channel c is given from the corresponding first normalized image $U_j$ value and the intensity image $I_j$ value by the formula $$N_j[x;y;c] = \frac{U_j[x;y;c]}{\varepsilon + I_j[x;y]}.$$

17. The method as claimed in claim 1, wherein the training of the convolutional neural network includes, for each training video, stacking the set of images ($S_j, U_j, I_j, N_j$) associated to the training video, into a global image representing the evolution of the position estimation of all key points (j) during the video, for use, as input, to the convolutional neural network.

18. The method as claimed in claim 2, wherein the training of the convolutional neural network includes, for each training video, stacking the set of images ($S_j, U_j, I_j, N_j$) associated to the training video, into a global image representing the evolution of the position estimation of all key points (j) during the video, for use, as input, to the convolutional neural network.

19. The method as claimed in claim 3, wherein the training of the convolutional neural network includes, for each training video, stacking the set of images ($S_j, U_j, I_j, N_j$) associated to the training video, into a global image representing the evolution of the position estimation of all key points (j) during the video, for use, as input, to the convolutional neural network.

20. A method, using a data processor, for classifying, using a convolution neural network, an action performed by a subject in an inputted video, comprising:
- (a) generating, for each frame ($t \in [1:T]$) of the inputted video, for each key point ($j \in [1:n]$) of the subject, a heat map ($\mathcal{H}_j^t$) of the key point (j) representing a position estimation of the key point (j) within the frame (t);
- (b) colorizing each heat map ($\{\mathcal{H}_j^t\}_{t \in [1:T], j \in [1:n]}$) as a function of a relative time of a corresponding frame (t) in the inputted video;
- (c) aggregating, for each key point ($j \in [1:n]$), all the colorized heat maps ($C_j^t$) of the key point (j) into at least one image ($S_j, U_j, I_j, N_j$) representing an evolution of a position estimation of the key point (j) during the inputted video; and
- (d) classifying, using the convolutional neural network, an action in the inputted video, using, as input, a set of images ($S_j, U_j, I_j, N_j$) representing the evolution of the position estimation of each key point (j) during the inputted video.

21. The method as claimed in claim 20, wherein the convolution neural network, is trained, using a plurality of training videos, each training video depicting a subject performing already classified actions, to classify actions performed by subjects in a target video, the training of the convolution neural network including (i) generating, for each frame ($t \in [1:T]$) of the training video, for each key point ($j \in [1:n]$) of the subject, a heat map ($\mathcal{H}_j^t$) of the key point (j) representing a position estimation of the key point (j) within the frame (t), (ii) colorizing each heat map ($\{\mathcal{H}_j^t\}_{t \in [1:T], j \in [1:n]}$) as a function of a relative time of a corresponding frame (t) in the video, (iii) aggregating, for each key point ($j \in [1:n]$), all the colorized heat maps ($C_j^t$) of the key point (j) into at least one image ($S_j, U_j, I_j, N_j$) representing an evolution of a position estimation of the key point (j) during the video; and (iv) training the convolutional neural network using, as input, the sets associated with each training video of images ($S_j, U_j, I_j, N_j$) representing the evolution of the position estimation of each key point (j) during the video.

22. The method as claimed in claim 21, wherein the colorizing of each heat map includes applying, to each heat map ($\mathcal{H}_j^t$) a C-dimensional colorization function ($o(t) = o_1(t), \ldots, o_C(t)$) depending on the relative time of the corresponding frame (t) in the video.

23. The method as claimed in claim 22, wherein the T frames are split into C−1 intervals, the C-dimensional colorization function (o(t)) being defined so that in each k-th interval, $k \in [1:C-1]$, the k-th component ($o_k(t)$) of the C-dimensional colorization function (o(t)) decreasing from 1 to 0, the k+1-th component ($o_{k+1}(t)$) of the C-dimensional colorization function (o(t)) increasing from 0 to 1, and any other component ($o_c(t)$) of the C-dimensional colorization function (o(t)) remains equal to 0.

24. The method as claimed in claim 23, wherein the components $o_c(t), c \in [1;C]$ of the C-dimensional colorization function o(t) satisfy the following properties:

$$\forall t_1, t_2 \in [1;T]^2, \sum_{c=1}^{C} o_c(t_1) = \sum_{c=1}^{C} o_c(t_2);$$

$\forall c \in [1;C]$, $o_c(t)$ being a continuous piecewise linear function.

25. The method as claimed in claim 22, wherein the colorized heat map value $C_j^t$ of a key point j at frame t for a pixel (x:y) and a channel $c \in [1:C]$ is given from the heat map value $\mathcal{H}_j^t$ by the formula $C_j^t[x:y:c] = o_c(t) \cdot \mathcal{H}_j^t[x:y]$, with $o_c(t)$ the c-th component of the C-dimensional colorization function o(t).

26. The method as claimed in claim 21, wherein the colorizing of each heat map includes, for each key point ($j \in [1:n]$), determining a raw image ($S_j$) by summing colorized heat maps ($C_j^t$) of the key point (j) over the frames (t).

27. The method as claimed in claim 26, wherein the colorizing of each heat map includes, for each raw image ($S_j$), the normalization of the raw image ($S_j$) into a first normalized image ($U_j$).

28. The method as claimed in claim 27, wherein the first normalized image $U_j$ value of a key point j for a pixel (x:y) and a channel c is given from the corresponding raw image $S_j$ value by the formula $$U_j^t[x; y; c] = \frac{S_j^t[x; y; c]}{\max_{x',y'} S_j^t[x'; y'; c]}.$$

29. The method as claimed in claim 27, wherein the colorizing of each heat map includes, for each first normalized image ($U_j$), the aggregation of the r channels of first normalized image ($U_j$) into a 1-channel intensity image ($I_j$).

30. The method as claimed in claim 29, wherein each intensity image ($I_j$) is determined by summing over the channels (c) the corresponding first normalized image ($U_j$).

31. The method as claimed in claim 29, wherein the colorizing of each heat map includes, for each first normalized image ($U_j$), the further normalization of the first normalized image ($U_j$) into second normalized image ($N_j$), as a function of the corresponding intensity image ($I_j$).

32. The method as claimed in claim 21, wherein the training of the convolutional neural network includes, for each training video, stacking the set of images ($S_j, U_j, I_j, N_j$) associated to the training video, into a global image representing the evolution of the position estimation of all key points (j) during the video, for use, as input, to the convolutional neural network.

* * * * *